Oct. 23, 1928.

C. J. HUBER 1,688,621

ARTIFICIAL TEETH

Filed April 18, 1927

INVENTOR
C. J. HUBER
BY
Richard J Cook
ATTORNEY

Patented Oct. 23, 1928.

1,688,621

UNITED STATES PATENT OFFICE.

CLINTON J. HUBER, OF SEATTLE, WASHINGTON.

ARTIFICIAL TEETH.

Application filed April 18, 1927. Serial No. 184,677.

This invention relates to improvements in artificial teeth and particularly to a method of securing the labial and buccal facing and pontic or root portions of an artificial tooth to a support or backing such as a portion of bridge work.

It is the principal object of this invention to provide an artificial tooth having its facing made separate from the pontic so as to permit the replacement of either without necessitating the removal of the other part, or bridge, and to provide each piece with a dove-tailed groove for receiving dove-tailed ribs formed on the backing for the purpose of securing the parts together.

Explanatory to the invention, it will be here stated that it is now the general practise to form the facing and pontic of an artificial tooth in a single piece which is secured to the backing in various ways, and it often happens that teeth of this character become damaged by breaking or chipping, and it is desirable that they be removed and replaced. Very frequently the tooth becomes off color and for that reason it is desired to have it replaced by one which matches the color of the adjacent teeth. When the facing and pontic of the tooth are formed as a single piece it is a very difficult task to remove and replace it without detaching the bridge; furthermore, for the replacement or repair of a facing or pontic it is required that the whole tooth be detached and replaced.

In view of the above stated disadvantages experienced, it has been the object of this invention to provide artificial teeth in which the pontic and facing portions are separately formed and separately secured to the backing, so as to permit either portion to be removed and replaced without necessitating the removal of the other part and which are so connected to the backing that this may be done on bridge work without necessitating its disconnection from the supporting teeth.

It is also an object of the invention to so standardize the cut of the adjoining surfaces of the facing and pontic portions that they are interchangeable; that is, any facing will fit any pontic of the same width and it is not required that adjoining faces be fitted at the time of assembly on the mounting.

Other objects of the invention reside in the various details of construction and combination of parts as is hereinbefore described.

In accomplishing these and other objects, I have provided the improved details of construction, the preferred forms of which are illustrated in the accompanying drawings, wherein—

Figure 1:
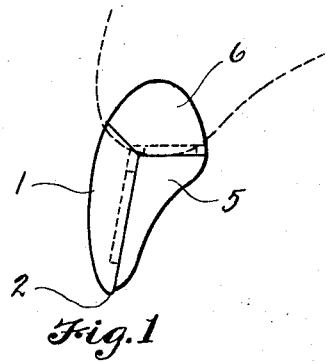
Figure 1 is an enlarged side elevation of a conventional type of tooth made in accordance with the present invention.
Figure 2:
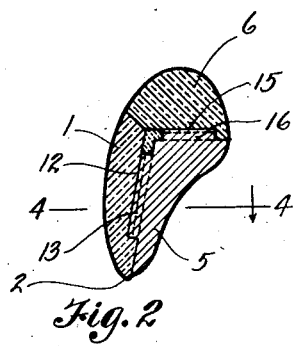
Figure 2 is a sectional view taken approximately through the longitudinal center of the tooth.
Figure 3:
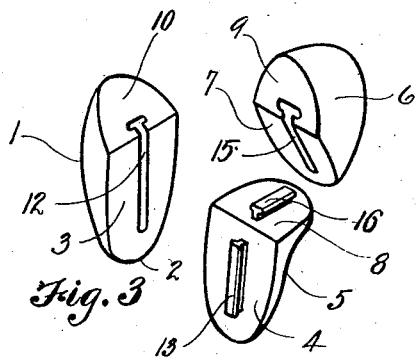
Figure 3 is a perspective view of parts of the tooth in disassembled relation.
Figure 4:
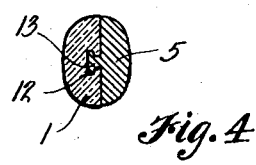
Figure 4 is a horizontal section on line 4—4 in Figure 2.
Figure 6:
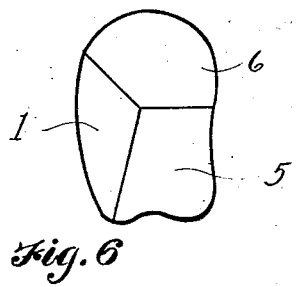
Figure 6 is a side view of a posterior tooth.

Referring more in detail to the drawings—

1 designates the labial or buccal facing of an artificial tooth which may be made of porcelain or other suitable material of such shape, size and color as to present the appearance of a natural tooth. From the biting, or incisive, edge 2, the facing is formed with a flat inner surface 3 which fits flatly against a flat outer surface 4 of a backing piece 5 preferably of metal.

6 designates the pontic or root portion of the tooth and this has a flat under surface 7 fitted to a flat surface 8 of the backing and has a beveled surface 9 adapted to join evenly and exactly with a beveled surface 10 at the base of the facing. It is intended in the manufacture of these teeth, that the surfaces 4 and 8 of all backings be made with the same degree of angularity and the joining beveled edges of all pontics and facings be the same so that any pontic may be used with any facing of the same width and vice versa, without necessitating any fitting of the joint at the time of assembly.

For the purpose of securing the root and facing to the backing, I have provided the facing, on its inner face with a longitudinally extending dove-tailed groove or slot 12 which opens through the beveled surface 10 and which is adapted to receive therein a dove-tailed rib 13 of gold that is fixed in the backing to extend from the surface 4. The pontic likewise is provided on its under surface with a dove-tailed groove 15 that opens at one end through the beveled surface 9 and is adapted to receive therein a gold, dove-tailed locking rib 16 projecting from and fixed in the top surface 8 of the backing. In applying the facing or pontic to the backing, a cement is first placed in the dove-tailed grooves and they are then slipped over the locking ribs so that the beveled surfaces are brought together in a tight joint where they are held by the setting of the cement.

Figure 5:
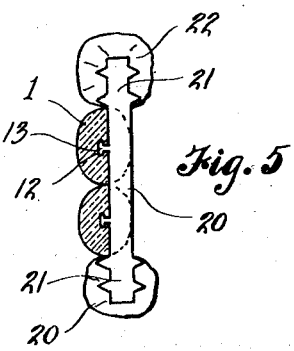
Figure 5 is a transverse view of two facings as secured to a bridge or backing with its lateral attachments.

The support or backing is complementary to the facing and is slightly narrower so as not to be exposed to view. In Figure 5 two facings are shown as supported by a bridge 20 integrally formed and provided with keys 21 at its ends for mounting in supporting teeth 22.

With this construction, if a facing is found to be off color or damaged, it may be removed and replaced without necessitating the detachment of the bridge or disturbing of the pontic portion. Either part may be detached and replaced without disturbing the complemental part.

I claim:

1. An artificial tooth comprising a backing provided with flat surfaces to which the facing and root portions may be fitted, dove-tailed ribs secured to the backing and extending from said surfaces, a facing fitted to its surface and having a beveled base end and a dove-tailed groove in its inner surface opening to the beveled end to receive the rib in an interlocking connection, and a root portion fitted to its surface and having a beveled end fitted to the beveled end of the facing in a close joint and provided with a dove-tailed groove opening to its beveled end to receive its attaching rib in an interlocking connection.

2. An artificial tooth comprising a backing provided with flat surfaces to which the facing and root portions may be fitted, a facing fitted to its surface and having a beveled base end, and a root portion fitted to its surface and having a beveled end fitted to the beveled end of the facing in a close joint; said facing and root portions having slidable, interlocking connections with the backing whereby either may be mounted or removed without disturbing the other piece.

Signed at Seattle, Washington, this 4th day of April, 1927.

CLINTON J. HUBER.